(12) United States Patent
Boulanov et al.

(10) Patent No.: US 9,587,822 B2
(45) Date of Patent: Mar. 7, 2017

(54) INTERNAL COMBUSTION BURNER

(75) Inventors: Oleg Boulanov, Nogent sur Oise (FR); Christopher Ellison, Liancourt (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 1132 days.

(21) Appl. No.: 12/594,948

(22) PCT Filed: Apr. 7, 2008

(86) PCT No.: PCT/FR2008/050610
§ 371 (c)(1),
(2), (4) Date: Dec. 23, 2009

(87) PCT Pub. No.: WO2008/139104
PCT Pub. Date: Nov. 20, 2008

(65) Prior Publication Data
US 2010/0139324 A1 Jun. 10, 2010

(30) Foreign Application Priority Data
Apr. 12, 2007 (FR) ..................... 07 54402

(51) Int. Cl.
*F23C 5/08* (2006.01)
*F23M 9/00* (2006.01)
(Continued)

(52) U.S. Cl.
CPC ............ *F23C 3/002* (2013.01); *C03B 37/044* (2013.01); *C03B 37/048* (2013.01); *F23C 7/002* (2013.01);
(Continued)

(58) Field of Classification Search
CPC ........ C03B 37/044; F23C 3/007; F23C 7/002; F23C 7/04; F23D 14/22; F23D 14/58; F23D 14/78; F23M 5/085; F23L 9/00; F23L 7/00
(Continued)

(56) References Cited

U.S. PATENT DOCUMENTS 2,800,175 A 7/1957 Sharp
3,327,503 A 6/1967 Labino
(Continued)

FOREIGN PATENT DOCUMENTS

EP 0 091 380 10/1983
EP 1 801 497 6/2007
(Continued)

OTHER PUBLICATIONS

French translation of Russian Office Action dated Jan. 17, 2012.

*Primary Examiner* — William G Corboy
(74) *Attorney, Agent, or Firm* — Oblon, McClelland, Maier & Neustadt, L.L.P.

(57) ABSTRACT

An internal combustion burner including a combustion chamber supplied with fuel and with oxidant and at least two combustion devices supplied with oxidant and with fuel. Combining two combustion devices of distinct configurations, which respectively generate two distinct types of flames with a system for cooling the walls of the burner by introducing air along the walls, makes it possible to obtain a burner that supplies a combustion gas temperature of up to 1700° C., while at the same time being easily cooled and occupying very little space so that it can, for example, be housed in an existing installation used in the manufacture of rock wool or glass wool.

29 Claims, 5 Drawing Sheets

(51) Int. Cl.
| | | |
|---|---|---|
| *F23C 3/00* | (2006.01) | |
| *C03B 37/04* | (2006.01) | |
| *F23C 7/00* | (2006.01) | |
| *F23L 7/00* | (2006.01) | |
| *F23C 7/04* | (2006.01) | |
| *F23D 14/22* | (2006.01) | |
| *F23D 14/58* | (2006.01) | |
| *F23D 14/78* | (2006.01) | |
| *F23L 9/00* | (2006.01) | |
| *F23M 5/08* | (2006.01) | |
| *C03B 37/06* | (2006.01) | |

(52) U.S. Cl.
CPC ............... *F23C 7/04* (2013.01); *F23D 14/22* (2013.01); *F23D 14/58* (2013.01); *F23D 14/78* (2013.01); *F23D 91/02* (2015.07); *F23L 7/00* (2013.01); *F23L 9/00* (2013.01); *F23M 5/085* (2013.01); *C03B 37/06* (2013.01); *F23C 2900/03005* (2013.01); *F23D 2214/00* (2013.01); *F23D 2900/11403* (2013.01); *F23D 2900/14003* (2013.01); *F23D 2900/14642* (2013.01)

(58) Field of Classification Search
USPC .................................. 431/181, 188, 190, 350
See application file for complete search history.

(56) References Cited

U.S. PATENT DOCUMENTS

| | | | | |
|---|---|---|---|---|
| 3,737,152 | A | | 6/1973 | Wilson |
| 3,811,277 | A | * | 5/1974 | Markowski .................... 60/733 |
| 4,077,205 | A | | 3/1978 | Pane et al. |
| 4,104,017 | A | | 8/1978 | Alin |
| 4,818,218 | A | | 4/1989 | Gest |
| 5,000,679 | A | * | 3/1991 | Fukuda et al. ................. 431/351 |
| 5,520,537 | A | * | 5/1996 | Taylor ........................... 431/353 |
| 5,680,766 | A | | 10/1997 | Joshi et al. |
| 5,944,507 | A | * | 8/1999 | Feldermann .................. 431/189 |
| 6,383,461 | B1 | * | 5/2002 | Lang ............................. 423/235 |
| 6,883,721 | B2 | * | 4/2005 | Marin et al. ...................... 239/8 |
| 2002/0066273 | A1 | * | 6/2002 | Kitamura et al. .............. 60/737 |
| 2004/0053180 | A1 | * | 3/2004 | Poe ................................ 431/195 |
| 2004/0112093 | A1 | * | 6/2004 | Beaufils et al. ................ 65/456 |
| 2007/0141522 | A1 | | 6/2007 | Borders et al. |

FOREIGN PATENT DOCUMENTS

| | | | | |
|---|---|---|---|---|
| FR | 2 379 028 | | 8/1978 | |
| FR | 2379028 | A1 | 8/1978 | |
| FR | EP 0775868 | A1 * | 5/1997 | ............. F23C 9/006 |
| GB | 1 205 897 | | 9/1970 | |
| JP | 63-3112 | | 1/1988 | |
| RU | 1836606 | A3 | 8/1993 | |
| RU | 2 173 818 | C2 | 9/2001 | |
| RU | 2005 129 938 | A | 4/2007 | |

\* cited by examiner

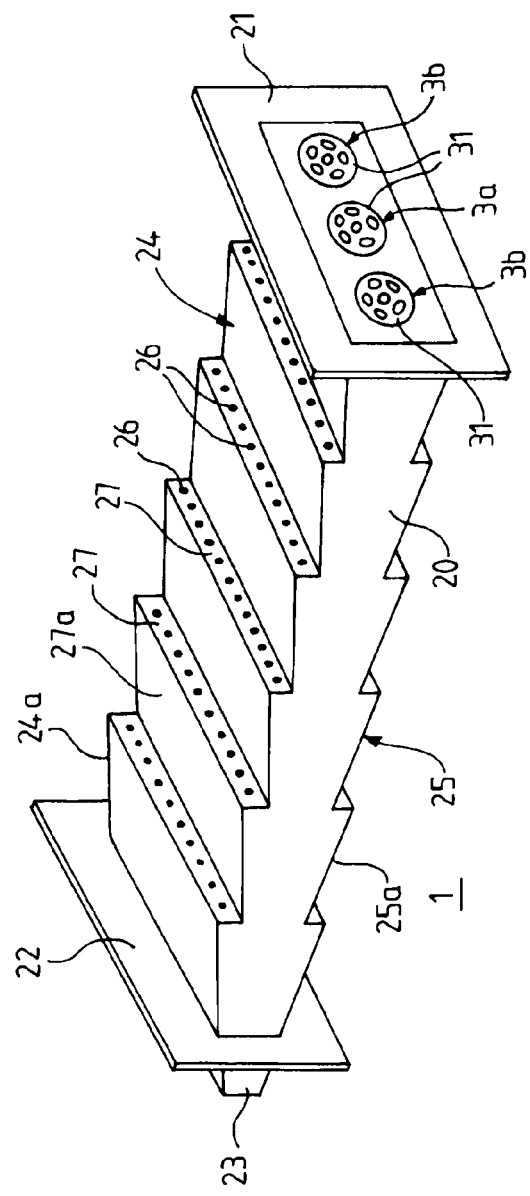
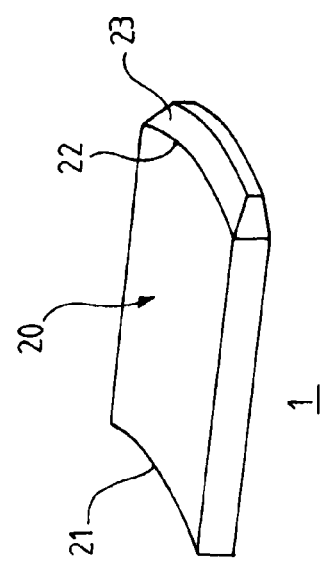

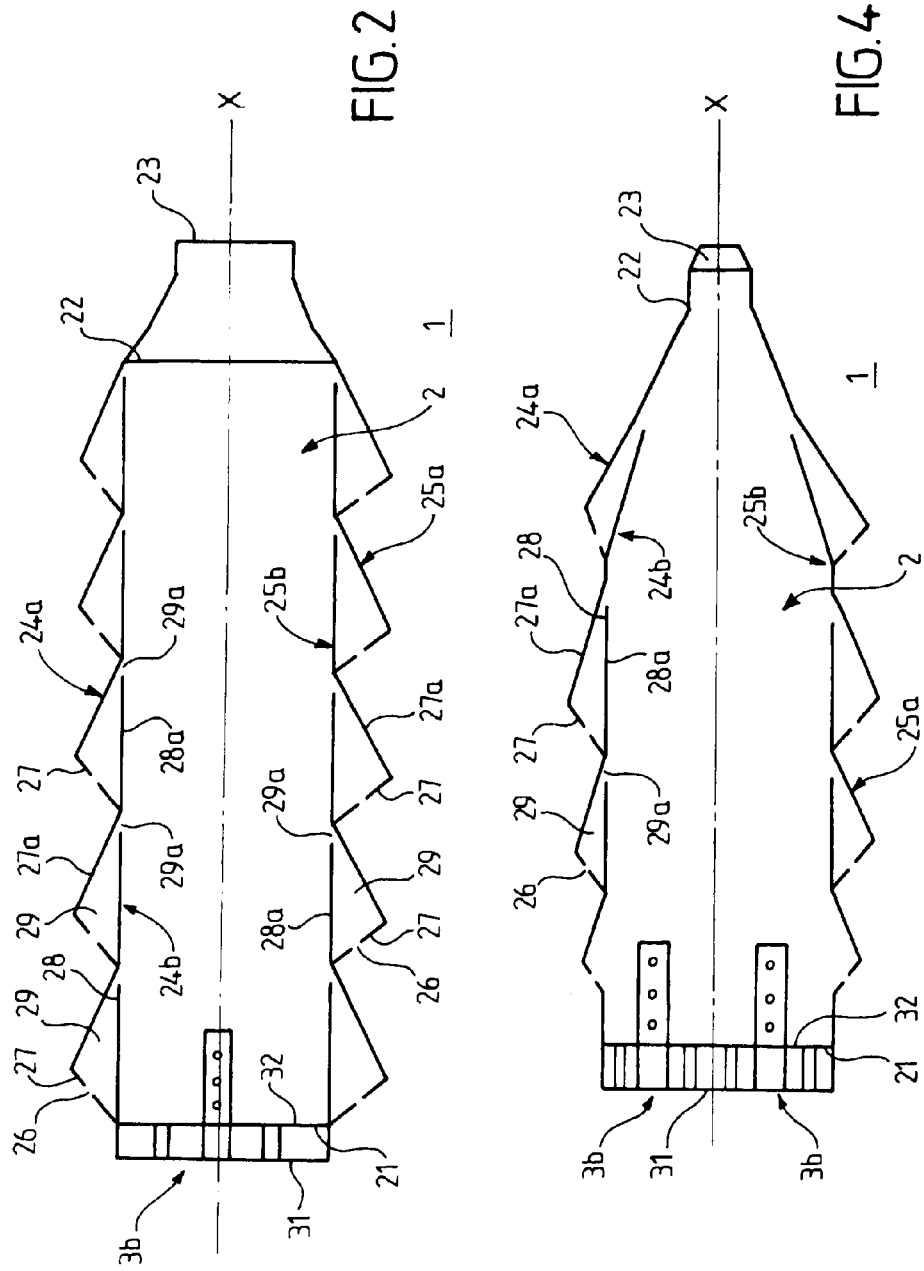

INTERNAL COMBUSTION BURNER

The invention relates to an internal combustion burner capable of producing gaseous streams at high temperature and high speed. More specifically, the invention deals with the burners used in methods of forming mineral fibres and in which the fibres are drawn as a result of the gaseous streams emitted by the said burners alone, or in conjunction with other means such as spinning means or drawing means of the bushing type.

The fiberizing method commonly used for glass fibres is the method known as the internal centrifugal process. This consists in introducing a thread of the drawable material in the molten state into a centrifuge, also known as a fiberizing spinner, revolving at high speed and pierced at its periphery with a great many holes through which the material is spun out in the form of filaments under the effect of centrifugal force. Using an annular burner, these filaments are then subjected to the action of a gaseous annular drawing stream at high temperature and high speed (in excess of 1000° C. in the case of temperature, and about 250 m/s in the case of speed) hugging the wall of the centrifuge which draws them out thinner and converts them into fibres. For further details on fiberizing methods using the internal centrifugal process, reference may be made to patent applications WO 99/65835 and WO 97/15532.

The fiberizing method commonly used for rock fibres is the method known as the external centrifugal process. The material that is to be fiberized is poured in the molten state onto the band around the periphery of the rotating spinner wheels, is accelerated by these wheels, detaches itself therefrom and is converted, in part, into fibres under the effect of centrifugal force, a gaseous stream being emitted tangentially to the band around the periphery of the wheels so as to pick up the fiberized material, separating it from the non-fiberized material and conveying it to a receiving member. For information on fiberizing by an external centrifugal process, reference may be made, for example, to patent application EP 195 725.

In the method of fiberizing using an external centrifugal process, the tangential gaseous stream emitted at the periphery of the spinner wheels generally consists of a stream of cold air or of flue gases cooled to a temperature close to ambient temperature (20 to 40° C.) with an average speed of 100 m/s for example. However, because of the substantial temperature gradient between the temperature of the fibres as they are ejected from the wheels (of the order of 1000° C.) and the cold temperature of the gaseous stream reaching the fibres, the fibre drawing quality is thereby affected.

In order very significantly to improve the quality of the fibres produced by an installation such as this, particularly to make them finer and also to achieve a lower grain content in the non-fiberized material (the term "grain" being used to denote particles larger than 100 microns in size which remain in the end product), the benefit of blowing a hotter gaseous stream has been demonstrated. This in particular is the subject of patent EP 465 310 which proposes the use of a gaseous stream of a temperature ranging between 250 and 900° C., preferably between 300 and 600° C. and more preferably still around 500° C.

Furthermore, reference may for example be made to patent application EP 0 091 380 regarding the production of a standard internal combustion burner which is, on the other hand, generally used for the internal centrifugal process.

The exterior wall of the combustion chamber of a burner such as this does, however, need to be cooled, and installing suitable cooling means, such as adding a refractory material of not insignificant thickness or including a water jacket around the chamber goes no way towards optimizing the size of the burner incorporating its cooling means.

In particular, a burner such as this remains too bulky to be able to be housed in the tight confines of a gaseous stream blowing system that has to be positioned in a device that uses the external centrifugal process.

It is therefore an object of the invention to propose an internal combustion burner providing hot air (700 to 1700° C.) which has cooling means that limit the radiation of heat from its walls, the burner occupying a small amount of space, with the dimensions along one of its sides preferably being limited to about 5 cm.

According to the invention, the internal combustion burner comprises a combustion chamber supplied with fuel and with oxidant, the chamber comprising a casing provided with a first end which is closed and with an opposite exhaust second end which is open and via which the combustion gases escape, the casing having at least two opposite walls connecting the two ends, the burner being characterized in that it comprises in the chamber and at the closed first end, at least two combustion devices supplied with oxidant and with fuel which are configured differently so as respectively to generate two distinct types of flame, and in that it is equipped with a system for cooling its walls by introducing a cooling gas such as air along the said walls.

The presence of two different combustion devices generating two distinct types of flame makes it possible to ensure that the burner will constantly have a short stable flame.

Specifically, when one of the combustion devices is configured to provide a flame that is short but somewhat instable at certain speeds, the second combustion device can accordingly be configured to ensure that the first device remains constantly lit. The second device instead has a flame that is long and soft and is, for its part, stable at all speeds.

Furthermore, the combustion device which provides a long soft flame can interact with several short-flame producing devices to ensure complete combustion within a small volume and uniform distribution of the heat within the burner, something which would otherwise be impossible with a single combustion device in which the flame, although stable, would be too long, leading to non-uniformity of heat (very hot in the middle and cold at the edges) and would leave the burner without combustion being completed within the said burner.

Finally, the cooling system allows a cooling gas to be introduced along the walls of the burner in the form of a shielding curtain which insulates the internal faces of the walls from the burner. This system constitutes an effective thermal protection of the casing of the combustion chamber without giving rise to a need for cumbersome cooling means.

The cooling system comprises a multitude of through-holes passing through the walls of the burner and through which air is intended to rush, and deflecting strips internal to the combustion chamber which each form, on the one hand, a cavity which faces several holes and is intended to receive the air from the said holes and, on the other hand, a guide slot which is intended to lead the air from the cavity towards the inside of the chamber.

According to one feature, the walls of the chamber have, on their external face, on the outside of the combustion chamber, a plurality of steps which extend along the shortest side of the wall and in which the through-holes are made.

Formed between the steps are landings configured in the manner of an ear of corn and which are angled towards the exhaust end of the burner.

The cavities thus distributed along the walls, on the inside of the chamber and delimited by the angled landings and the deflecting strips, make it possible to introduce turbulence into the air entering the cavities via the through-holes and are directed towards the guide slots. This turbulent air cools the deflecting strips in direct contact with the inside of the chamber in which combustion, and therefore the release of heat, occurs.

Furthermore, the guide slots via which the air leaves the cavities also contribute to the direct cooling of the inside of the chamber.

The deflecting strips advantageously are orientated suitably, such as co-planar with the internal faces of the walls, so that the air from the guide slots displays directional flow substantially parallel to the walls of the chamber, guaranteeing optimum cooling.

It must be noted that the number of holes and the size thereof, and therefore the surface area for the passage of air through the walls, are adapted in particular to suit the wall thickness and the height of the burner so as to cool the walls of the burner correctly. In particular, the size of the holes could be enlarged near the combustion devices when the dimensions of the latter are increased.

According to the invention, each combustion device comprises a body which has a first face and a second face opposite to the first and on the combustion side, the body having passing through its thickness from one face to the other several oxidant supply ducts and one fuel supply duct of axis Y perpendicular to the faces of the body, the fuel supply duct being positioned centrally with respect to the oxidant supply ducts and comprising an extension projecting beyond the second face of the body and beyond the oxidant supply ducts, the projecting part being provided with a plurality of holes.

According to one embodiment of the combustion device, the body comprises a peripheral surround which projects beyond the second face of the body so as partially or completely to encircle the outlets of the oxidant supply ducts.

According to this same embodiment, in the case of one of the combustion devices, the ducts are inclined with respect to the axis Y of the central duct and each oxidant supply duct has an inlet on the first face of the body of the device and an outlet opening onto the surface of the second face of the body of the device, the inlets and the outlets of the ducts being arranged in circles of the same diameter around the oxidant supply duct.

According to another embodiment of the combustion device, in the case of one of the combustion devices, the oxidant supply ducts are inclined with respect to the axis Y of the central fuel supply duct, and each duct has an inlet on the first face of the body of the device and an outlet opening onto the surface of the second face of the body of the device, the inlets and the outlets of the ducts being arranged in circles of different diameters about the oxidant supply duct, the circle formed by the outlets being of the smaller diameter.

The combustion devices are arranged substantially in a line in the case of a burner casing of substantially parallelepipedal shape or are arranged in a circle in the case of a burner casing of annular shape. Substantially in a line must be understood to mean an arrangement which has a linear overall direction which may be perfectly aligned or may be misaligned, for example staggered.

According to one feature, the oxidant is formed of presurized air, while the fuel consists of a gas for example or a mixture of gases.

According to another feature, the walls of the burner are advantageously spaced at most 5 cm apart.

The burner casing is preferably made of metal.

The burner is intended to be arranged in an enclosed space consisting of an airtight casing which has at least one pressurized-air supply inlet and has passing through it fuel supply pipes which are connected to the combustion devices. The airtight casing may, as appropriate, be formed at least partially of elements that make up the existing mineral wool manufacturing installation, for example the housing of the machine for the manufacture of rock wool.

The burner of the invention is for example used in an installation for fiberizing mineral wool, particularly rock wool or glass wool. An installation such as this may, of course, be equipped with a plurality of burners.

Finally, the invention relates to a method of manufacturing mineral wool using a device that employs an external or internal centrifugal process, particularly of standard form, which uses at least one burner of the invention. A device of standard form is to be understood to mean a device with a configuration and dimensions which are those which are customary in existing installations. The burner of the invention is thus adapted to be housed in an existing device.

According to one feature of the method, a first type of flame that is unstable at certain speeds and a second type of flame that ensures that the first type of flame remains constantly lit are produced inside the burner.

According to another feature, a cooling gas consisting of pressurized air is provided for cooling the walls of the burner.

Other details and advantages of the invention will now be described with reference to the attached drawings in which:

FIG. 1 is a perspective view of a burner according to the invention;

FIG. 2 is a view in cross section of the burner of FIG. 1;

FIG. 3 is a schematic perspective view of an alternative form of the burner of FIG. 1 intended to be housed in a fiberizing device using an external centrifugal process;

FIG. 4 is a view in cross section of another alternative form, in an annular configuration, of a burner according to the invention with several rows of combustion devices;

Figure 8:
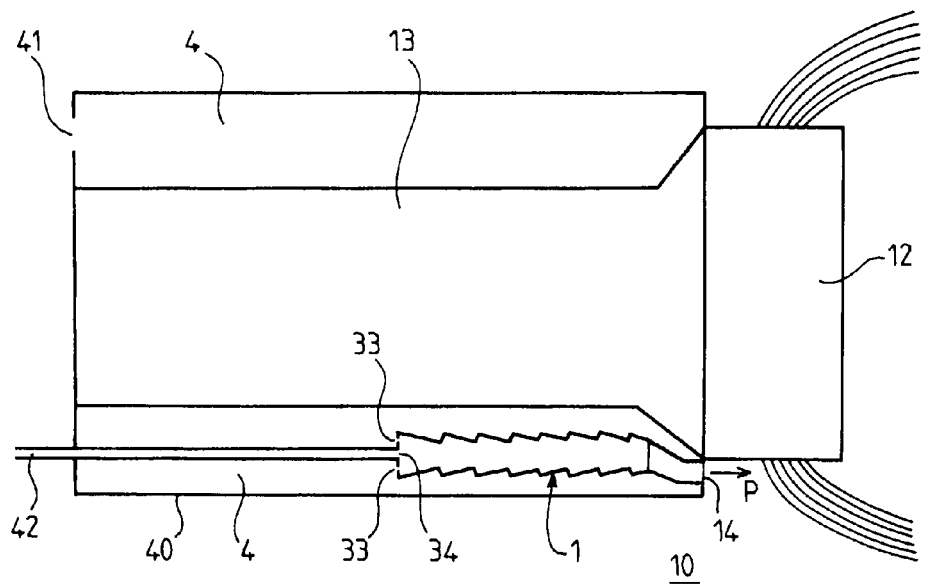
FIG. 8 illustrates a schematic partial view in cross section of a device for the manufacture of rock wool incorporating the burner of FIG. 1.

The internal combustion burner 1 illustrated in FIGS. 1 to 3 is intended to be used in an installation for the manufacture of mineral wool, such as an installation for the manufacture of rock wool illustrated in part in FIG. 8 and comprising a device 10 that draws the fibres using an external centrifugal process.

Figure 5:
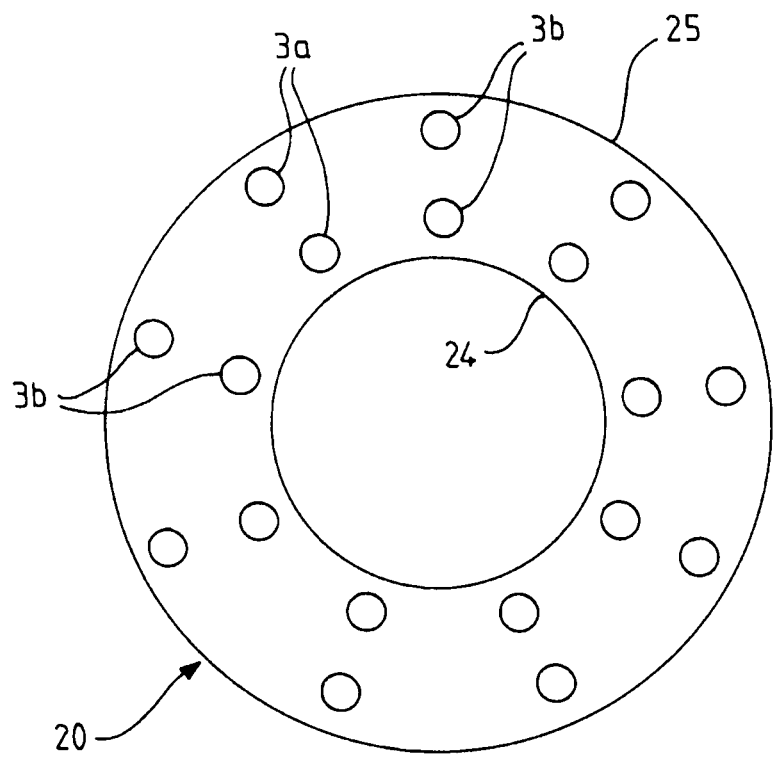
FIG. 5 is another schematic view in cross section of the annular burner of FIG. 4.
Figure 6A:
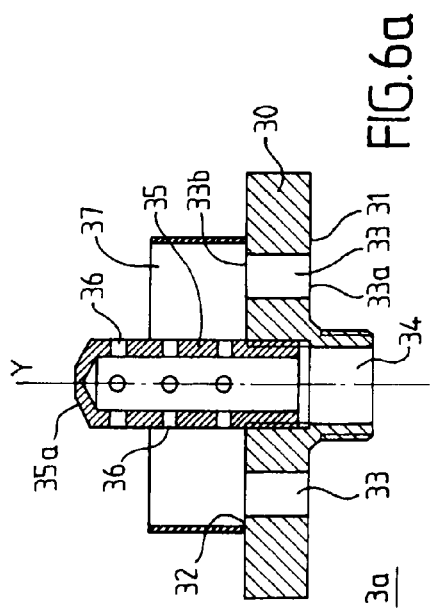
FIGS. 6a and 6b are views in cross section of two respective alternative forms of combustion devices that form part of the burner of the invention.
Figure 9:
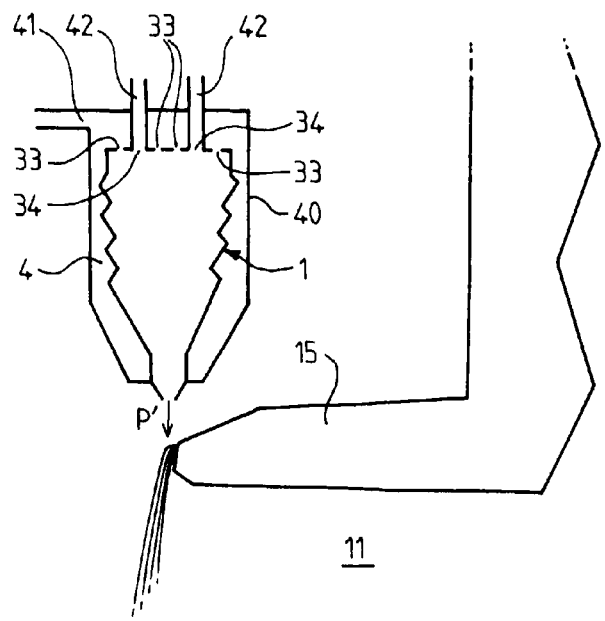
FIG. 9 illustrates a schematic partial view of a device for the manufacture of glass wool incorporating the burner of FIG. 4.

The burner 1 illustrated in FIGS. 4 and 5 is intended to be used in an installation for the manufacture of mineral wool, such as glass wool, which is illustrated in part in FIG. 9 and comprises a device 11 for drawing the fibres using an internal centrifugal process.

The burner of the invention is intended, for its operation, to be enclosed in a hermetically enclosed space filled with pressurized air. The air is used to cool the burner. Advantageously, the air is also used to supply the burner with oxidant.

As illustrated in FIGS. 1 to 5, the burner 1 of the invention comprises a combustion chamber 2 and a plurality of combustion devices 3a and/or 3b from which flames are generated in order to generate combustion gases.

The combustion chamber 2 has a casing 20 provided with two opposite ends, one end 21 for the supply of oxidant and fuel and one end 22 for exhausting the combustion gases. The casing is preferably made of metal, consisting of sheet metal 1 mm thick for example. The greater the thickness of the casing, the more difficult it will be to cool.

The burner of FIG. 1, a cross sectional view of which is given in FIG. 2, has a substantially parallelepipedal casing so that it can be positioned in a device employing an external centrifugal process.

FIG. 3 illustrates a schematic view of an alternative form of FIG. 1 in which the casing is of substantially parallelepipedal overall shape and of which the ends 21 and 22 are in the form of circular arcs. This shape allows the burner to be housed in the current space available in a system delivering a gaseous stream of a standard device employing an external centrifugal process.

The cross sectional view of FIG. 4 illustrates the casing 20 of a burner. Its annular shape (viewed in cross section in FIG. 5) allows it to be housed in a device employing an internal centrifugal process.

The combustion devices 3a, 3b are situated at one of the ends 21 of the combustion chamber and close this chamber. FIG. 1 shows the rear faces 31 of the combustion devices which are on the opposite side to the combustion faces 32 that are internal to the chamber.

The opposite, exhaust, end 22 of the combustion chamber is open to allow the combustion gases to escape. The chamber extends over a certain length, as is already known, in order to provide the volume needed for combustion.

At the exhaust end 22 and on the outside of the chamber there is preferably a snout 23 which assists in guiding the combustion gases as they escape from the chamber.

The casing 20 has two opposite walls 24 and 25 which extend along the longest sides of the chamber and connect the two ends 21 and 22. These walls are provided within their thickness with a multitude of through-holes 26 which, as we shall see later, are used to cool the combustion chamber 2.

The external faces 24a and 25a of the walls are non-planar; they exhibit a number of steps 27 extending along the width of each wall in the case of the parallelepipedal casing (FIG. 1 or 2) or along the entire perimeter of each wall in the case of the annular casing (FIG. 4). These steps give the external faces a series of landings 27a which are configured like an ear of corn and are symmetric with respect to the longitudinal axis of symmetry X of the burner. The landings 27a between each step are angled towards the axis X and the exhaust end 22.

The holes 26 are made in the steps 27.

The internal faces 24b and 25b inside the chamber 2 comprise a succession of strips 28 which are secured by one of their ends and face the steps 27 and the landings 27a. These strips give rise to cavities 29 into which the holes 26 open.

The opposite end of the strips to the end at which they are attached to the internal faces of the chamber is free, leaving thin guide slots 29a between the said strips and the internal faces of the walls, at the outlet from the cavity 29.

The holes 26, the cavities 29 and the guide slots 29a thus form a cooling system for the walls 24 and 25 of the combustion chamber inside which the heat is intended to propagate as a result of the combustion.

Pressurized air is intended to rush into the cavities 29 via the holes 26, to form turbulence in the cavities as a result of the presence of the strips 28 which act as deflectors, and to escape through the guide slots 29a to bathe the inside 24b, 25b of the walls of the chamber formed, to a large extent, by the faces 28a of the strips 28.

The air present in the cavities cools the strips 28 the faces 28a of which are in direct contact with the combustion.

The strips 28 have an orientation adapted, in this instance substantially parallel to the axis X, so that the air leaving the slots 29a is directed in a stream parallel to the internal faces 24b, 25b of the walls in order to cool them.

One the one hand, the air licking the walls of the chamber prevents the hot gases of combustion from filling the interior volume of the chamber which means that the walls of the chamber are protected against overheating. On the other hand, the air ingested near the combustion devices 3a and 3b contributes to combustion by supplying additional oxidant. Finally, downstream of the flames of the combustion devices, the ingested air can be used to cool the escaping combustion gases at a temperature that may be as high as 1700° C.

The air entering through the holes 26 is pressurized air supplied by a suitable arrangement of the burner 1 in the device for which it is intended. This arrangement will be described later on with reference to FIGS. 8 and 9.

Let us now describe the combustion devices.

The number and arrangement of combustion devices are tailored to suit the use made of the burner, namely whether it is intended for an external centrifugal method or for an internal centrifugal method.

Two respective alternative forms of embodiment of the combustion devices 3a and 3b are given with reference to FIGS. 6a, 7a and 6b, 7b, respectively. These two respective alternative forms correspond to two distinct types of flame.

For burner operation it is important in its configuration to have at least one combustion device of each alternative form.

Each device 3a and 3b is a metal component which comprises, in common, a solid body 30 that has a first face 31, and a second face 32 on the opposite side to the first and intended to be on the combustion side.

Passing through the thickness of the body and from one face to the other are several oxidant supply ducts 33 and a cylindrical fuel supply duct 34 of axis Y perpendicular to the faces 31 and 32 of the body. The ducts are machined from the mass of the body 30.

The fuel supply duct 34 is positioned centrally with respect to the oxidant supply ducts 33.

The duct 34 also has a cylindrical and hollow extension 35 which projects beyond the second face 32 of the body and beyond the oxidant supply ducts 33. It is, for example, welded onto the face 32 of the body 30 or screwed into the wall of the duct 33.

The extension 35 is closed at its free end 35a which is the opposite end to the face 32. In addition, it is provided in its wall with a multitude of holes 36 through which the fuel is intended to escape.

The duct 34 is intended to be connected hermetically and at the face 31 to a fuel supply pipe, while the supply ducts 33 are intended to receive pressurized air which rushes in at the face 31 via the inlets 33a and re-emerges on the face 32 via the outlets 33b.

The ducts 33 are intended, at the outlets 33a, to be placed in direct connection at the face 31 with a cavity which contains a pressurized oxidant (preferred mode of supply) or connected to pressurized oxidant supply pipes.

The fuel in gaseous form which is intended to be introduced into the duct 34 continues its path along the extension 35 to escape through the holes 36 in the form of jets substantially perpendicular to the axis Y. The jets of fuel are intended to mix with the oxidant, such as air for example, from the ducts 33 and, under the effect of a spark, the combination of the fuel and of the oxidant will give rise to a flame and combustion.

Alternative form 3a of the device differs from that 3b in that the body 30 further comprises a peripheral surround 37, preferably of annular shape, projecting beyond the second face 32 of the body and encircling the outlets 33b of the oxidant supply ducts.

The surround is formed as a single piece but could just as easily be made up of a number of contiguous or non-contiguous plates. Its function is to confine the oxidant to the fuel exhaust region.

Figure 7A:
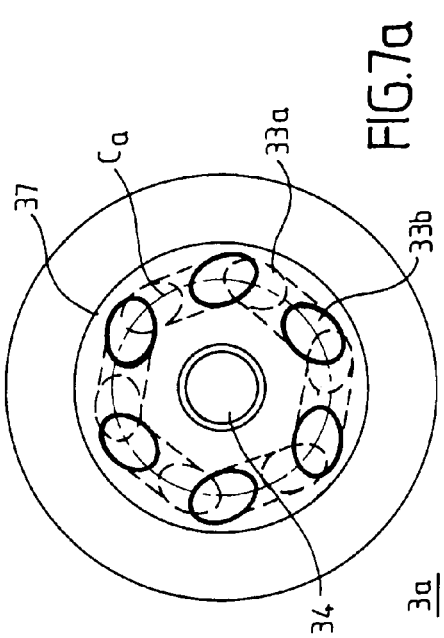
FIGS. 7a and 7b are views in cross section and from above of the combustion face of the devices of FIGS. 6a and 6b respectively.
Figure 6B:
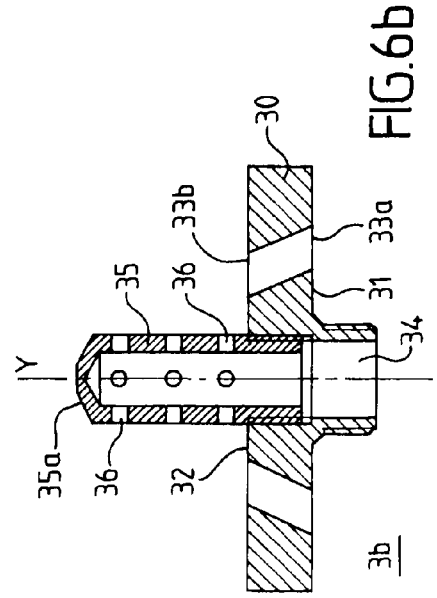
Figure 7B:
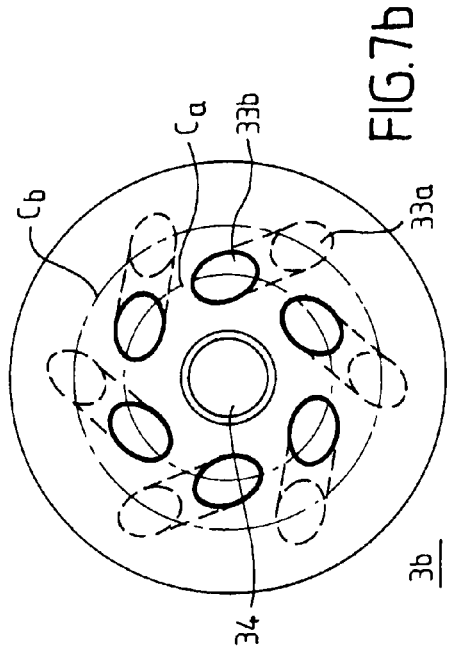

FIGS. 7a and 7b are views from above of the devices. The continuous line corresponds to the visible combustion face 32 while the discontinuous line corresponds to the opposite face 31. It can be seen that the cylindrically shaped oxidant supply ducts 33 have inlets 33a and outlets 33b the cross sections of which are identical in terms of shape and size.

The combustion devices 3a and 3b differ, by contrast, in the angling of the oxidant supply ducts 33 with respect to the central fuel duct 34.

For one combustion device 3a (FIG. 7a), the inlets 33a and the outlets 33b are arranged in a circle around the central duct 34 and are respectively arranged in circles (reference $C_a$ in discontinuous line) of identical diameters on the rear face 31 and the front combustion face 32, respectively.

In addition, the ducts 33 have axes that are angled with respect to the axis Y of the central duct 34 so that the inlets 33a and the outlets 33b do not exactly face each other. This angling ensures that the air stream leaving the combustion face 32 is swirling and of a symmetrical shape about the axis Y.

Finally, the surround 37 guides the air leaving the ducts 33 so that it escapes in the form of a cylindrical vortex.

The device 3a through its configuration makes possible to generate a long stable flame.

In the case of the combustion device 3b (FIG. 7b), the supply ducts 33 are also inclined with respect to the axis Y, but the inlets 33a of the oxidant supply ducts 33 are arranged in a circular layout in a circle (reference $C_b$ in discontinuous line) of a diameter greater than that of the circle (reference $C_a$ in discontinuous line) on which the outlets 33b lie.

This arrangement of the ducts 33 generates, at the face 32, a vortex of air rotating about the axis Y and which is tight at the base on the face 32 and widens away from the face 32, like the vortex associated with a cyclone or whirlwind.

The device 3b through its configuration makes it possible to generate a flame that is stronger but not as stable as that of the other device 3a.

When the combustion devices 3a and 3b are positioned substantially in line with one another to constitute the substantially parallelepipedal burner of FIG. 1 there are, for example, three of them.

Advantageously, a cylindrical air vortex device 3a is positioned in the middle between two cyclone air vortex devices 3b. This is because, once the burners have been lit, for example by means of a spark plug, the burner 3a which presents a soft but stable flame ensures that the devices 3b, which have a tendency to become extinguished at the critical low temperature and low pressure regimes of between 300 and 500° C., in particular and a pressure of the order of 100 mmH$_2$O and high temperature and pressure (particularly 1700° C. and between 500 and 600 mmH$_2$O) regimes, will remain constantly lit.

In an annular burner of FIG. 4 there are, for example, ten or so combustion devices 3a and 3b alternating in a circle (FIG. 5).

The temperature of the combustion gases delivered by the burner of the invention ranges as high as 1700° C. The speed of the combustion gases is adapted to suit the desired combustion regime on the basis of the proportions of the oxidant/fuel mixture and the imposed supply flow rates.

We shall now describe the supply of oxidant and of fuel to the burner and the cooling of this burner when it is housed in the device for which it is intended.

FIG. 8 illustrates a partial view in cross section of a rock wool fiberizing installation of standard form comprising a device 10 for drawing the fibres by an external centrifugal process.

The drawing device 10 comprises spinner wheels of which one, referenced 12, can be seen in FIG. 8. This wheel is driven by a rotary shaft 13. It comprises, around it, particularly over a circumference of 120 to 300°, a drawing lip 14 from which the drawing gases are blown.

The installation comprises a plurality of burners 1 according to the invention corresponding to the burner in FIG. 3 and just one of which is visible in the cross sectional view of FIG. 8. There are, for example, three burners distributed around the wheel 12 in such a way as to supply the entire drawing lip 14 with hot gases. As a preference, the burners will be distributed around at least the wheel which, in a standard installation, generates the greatest amount of non-fiberized material.

The burner is advantageously housed in the empty space, the height of which does not exceed 5 cm, left between the wall of the rotary shaft 13 and the housing of the device.

The combustion gases escaping from the burner 1 are emitted at right angles to the plane in which the wheel 12 rotates, in the direction P. The molten material for fiberizing is tipped out onto the band around the periphery of the wheel, detaches itself therefrom as a result of the rotation of the wheel, and is drawn out by virtue of the gaseous streams escaping from the burner 1 and from the drawing lip 14.

FIG. 9 illustrates another annular shape of burner 1 according to the invention for the internal centrifugal method. The fiberizing device 11 comprises a centrifuge 15, also known as a fiberizing spinner, into which the molten material for fiberizing is poured. As a result of the centrifugal force imparted to the spinner, the material escapes in the form of filaments through orifices with which the peripheral wall of the spinner is provided. The filaments are in turn drawn into the form of fibres by the gases from an annular burner 1, like the one in FIG. 4, which are directed substantially tangentially along P' to the direction of the filaments.

The burner 1 for each of the installations of FIGS. 8 and 9 is positioned in an enclosed space 4 which is supplied with pressurized air in order advantageously to supply oxidant to the devices 3a and 3b and to provide the walls of the burner with cooling.

The space 4 consists of a hermetic casing 40, for example made of metal, delimited in particular in FIG. 8 by the metal sheet of the housing and the wall of the shaft 13. The casing has at least one air supply inlet 41.

Pipes 42 for supplying fuel such as gas for the combustion devices 3a and 3b pass in an airtight manner through the casing 40 and are connected to the supply ducts 34.

As a preference, the ducts 33 for supplying the combustion devices with oxidant are therefore supplied directly with pressurized air from the space 4.

Finally, the air filling the space 4 rushes through the holes 26 in the walls of the burner to cool them as already explained above.

Thus, the burner of the invention irrespective of its destination and in a small volume allows complete combustion in its combustion chamber and cooling of its walls by virtue of the plurality of combustion devices at least one combination of each alternative form of which is used, by virtue of the small size of the combustion devices and by virtue of the perforation and tailored profile of the walls of the burner.

The invention claimed is:

1. An internal combustion burner comprising:
a combustion chamber supplied with fuel and with oxidant, the chamber comprising a casing including a first end which is closed and with an opposite exhaust second end which is open and via which the combustion gases escape, the casing including at least two opposite walls connecting the two ends,
and further comprising in the chamber and at the closed first end, at least two combustion devices supplied with oxidant and with fuel, the at least two combustion devices include a first type of combustion device and a second type of combustion device that are configured differently so as respectively to generate two distinct types of flame, and including a system for cooling the two opposite walls by introducing a cooling gas along the two opposite walls,
wherein each combustion device includes a body having a first face facing an exterior of the combustion chamber at the first end and a second face opposite to the first face and facing an interior of the combustion chamber, the body including plural oxidant supply ducts and one fuel supply duct passing through a thickness of the body from one face to the other, with an axis of the fuel supply duct being perpendicular to the faces of the body,
wherein the first type of combustion device and the second type of combustion device are arranged alternating in a ring on the first face of the body facing the exterior of the combustion chamber,
wherein in a case of one of the combustion devices, the oxidant supply ducts are inclined with respect to the axis of the central fuel supply duct and each oxidant supply duct includes an inlet on the first face of the body of the device and an outlet opening onto the surface of the second face of the body of the device, the inlets and the outlets of the ducts being arranged in circles around the central fuel supply duct,
wherein in the case of one of the combustion devices, a diameter of the circle of the plural inlets arranged around the central fuel supply duct have a same size as a diameter of the circle of the plural outlets arranged around the central fuel supply duct, and
wherein, for each of the plural inlets and outlets, a diameter of the inlet is the same as a diameter of the corresponding outlet.

2. A burner according to claim 1, wherein the cooling system is configured to generate a shielding curtain of cooling gas that insulates the second face of the walls from the flames.

3. A burner according to claim 1, wherein the cooling system comprises a plurality of through holes passing through the walls and through which air is to rush, and deflecting strips internal to the combustion chamber and each forming a cavity that faces plural holes and is to receive the air from the holes and a guide slot to lead the air from the cavity towards the inside of the chamber.

4. A burner according to claim 3, wherein the walls of the chamber includes, on their external face, on the outside of the combustion chamber, a plurality of steps that extend along a shortest side of the wall and in which the through-holes are made.

5. A burner according to claim 4, further comprising, formed between the steps, landings configured in the manner of an ear of corn and that are angled towards the exhaust end of the burner.

6. A burner according to claim 3, wherein the deflecting strips are orientated so that the air from the guide slots displays a directional flow substantially parallel to the internal faces of the walls of the chamber on the combustion side.

7. A burner according to claim 1, wherein the fuel supply duct is positioned centrally with respect to the oxidant supply ducts and includes an extension projecting beyond the second face of the body and beyond the oxidant supply ducts, the projecting part being provided with a plurality of holes.

8. A burner according to claim 1, wherein the body comprises a peripheral surround that projects beyond the second face of the body so as partially or completely to encircle outlets of the oxidant supply ducts.

9. A burner according to claim 1, wherein the combustion devices are arranged in a circle in a case of a burner casing of annular shape.

10. A burner according to claim 1, wherein the walls are spaced at most 5 cm apart.

11. A burner according to claim 1, wherein the casing is made of metal.

12. An internal combustion burner comprising:
a combustion chamber supplied with fuel and with oxidant, the chamber comprising a casing including a first end which is closed and with an opposite exhaust second end which is open and via which the combustion gases escape, the casing including at least two opposite walls connecting the two ends,
and further comprising in the chamber and at the closed first end, at least two combustion devices supplied with oxidant and with fuel, the at least two combustion devices are positioned adjacent each other, the at least two combustion devices include a first type of combustion device and a second type of combustion device and are configured differently so as respectively to generate two distinct types of flame, and including a system for cooling the two opposite walls by introducing a cooling gas along the two opposite walls,
wherein each combustion device includes a body having a first face facing an exterior of the combustion chamber at the first end and a second face opposite to the first face and facing an interior of the combustion chamber, the body including plural oxidant supply ducts and one fuel supply duct passing through a thickness of the body from one face to the other, with an axis of the fuel supply duct being perpendicular to the faces of the body, wherein the first type of combustion device and the second type of combustion device are arranged alternating in a ring on the first face of the body facing the exterior of the combustion chamber, wherein in a case of one of the at least two combustion devices, the oxidant supply ducts are inclined with respect to the axis of the central fuel supply duct and each oxidant supply duct includes an inlet on the first face of the body of the device and an outlet opening onto the surface of the second face of the body of the device, the inlets and the outlets of the ducts being arranged in circles around the central fuel supply duct, the circles of the inlets and the outlets of the ducts arranged about the central fuel supply duct have different diameters, and a diameter of the circle formed by the outlets has a smaller diameter than a diameter of the circle formed by the inlets, and wherein in a case of one of the at least two combustion devices, the oxidant supply ducts are inclined with respect to the axis of the central fuel supply duct and each oxidant supply duct includes an inlet on the first face of the body of the device and an outlet opening onto the surface of the second face of the body of the device, wherein the inlets and the outlets of the ducts are arranged in circles around the central fuel supply duct, a diameter of the circle of the plural inlets arranged around the central fuel supply duct has a same size as a diameter of the circle of the plural outlets arranged around the central fuel supply duct, and wherein for each of the plural inlets and outlets, a diameter of the inlet is the same as a diameter of the corresponding outlet.

13. A burner according to claim 12, wherein the cooling system is configured to generate a shielding curtain of cooling gas that insulates the second face of the walls from the flames.

14. A burner according to claim 12, wherein the cooling system comprises a plurality of through holes passing through the walls and through which air is to rush, and deflecting strips internal to the combustion chamber and each forming a cavity that faces plural holes and is to receive the air from the holes and a guide slot to lead the air from the cavity towards the inside of the chamber.

15. A burner according to claim 14, wherein the walls of the chamber includes, on their external face, on the outside of the combustion chamber, a plurality of steps that extend along a shortest side of the wall and in which the through-holes are made.

16. A burner according to claim 15, further comprising, formed between the steps, landings configured in the manner of an ear of corn and that are angled towards the exhaust end of the burner.

17. A burner according to claim 14, wherein the deflecting strips are orientated so that the air from the guide slots displays a directional flow substantially parallel to the internal faces of the walls of the chamber on the combustion side.

18. A burner according to claim 12, wherein the fuel supply duct is positioned centrally with respect to the oxidant supply ducts and includes an extension projecting beyond the second face of the body and beyond the oxidant supply ducts, the projecting part being provided with a plurality of holes.

19. A burner according to claim 12, wherein the body comprises a peripheral surround that projects beyond the second face of the body so as partially or completely to encircle outlets of the oxidant supply ducts.

20. A burner according to claim 12, wherein the combustion devices are arranged in a circle in a case of a burner casing of annular shape.

21. A burner according to claim 12, wherein the walls are spaced at most 5 cm apart.

22. A burner according to claim 12, wherein the casing is made of metal.

23. A burner according to claim 12, wherein one of the at least two combustion devices is a cylindrical air vortex device, and another of the at least two combustion devices is a cyclone air vortex device.

24. A fiberizing installation comprising one or more burners, the one or more burners comprising a combustion chamber supplied with fuel and with oxidant, the chamber comprising a casing including a first end which is closed and with an opposite exhaust second end which is open and via which the combustion gases escape, the casing including at least two opposite walls connecting the two ends, and further comprising in the chamber and at the closed first end, at least two combustion devices supplied with oxidant and with fuel, the at least two combustion devices are positioned adjacent each other, the at least two combustion devices include a first type of combustion device and a second type of combustion device and are configured differently so as respectively to generate two distinct types of flame, and including a system for cooling the two opposite walls by introducing a cooling gas along the two opposite walls, wherein each combustion device includes a body having a first face facing an exterior of the combustion chamber at the first end and a second face opposite to the first face and facing an interior of the combustion chamber, the body including plural oxidant supply ducts and one fuel supply duct passing through a thickness of the body from one face to the other, with an axis of the fuel supply duct being perpendicular to the faces of the body, wherein the first type of combustion device and the second type of combustion device are arranged alternating in a ring on the first face of the body facing the exterior of the combustion chamber, wherein in a case of one of the at least two combustion devices, the oxidant supply ducts are inclined with respect to the axis of the central fuel supply duct and each oxidant supply duct includes an inlet on the first face of the body of the device and an outlet opening onto the surface of the second face of the body of the device, the inlets and the outlets of the ducts being arranged in circles around the central fuel supply duct, the circles of the inlets and the outlets of the ducts arranged about the central fuel supply duct have different diameters, and a diameter of the circle formed by the outlets has a smaller diameter than a diameter of the circle formed by the inlets, and wherein in a case of one of the at least two combustion devices, the oxidant supply ducts are inclined with respect to the axis of the central fuel supply duct and each oxidant supply duct includes an inlet on the first face of the body of the device and an outlet opening onto the surface of the second face of the body of the device, wherein the inlets and the outlets of the ducts are arranged in circles around the central fuel supply duct, a diameter of the circle of the plural inlets arranged around the central fuel supply duct has a same size as a diameter of the circle of the plural outlets arranged around the central fuel supply duct, and wherein for each of the plural inlets and outlets, a diameter of the inlet is the same as a diameter of the corresponding outlet.

25. A fiberizing installation according to claim 24, wherein the burner is arranged in an enclosed space including an airtight casing that includes at least one pressurized air supply inlet and that further includes passing through it fuel supply pipes connected to the combustion devices.

26. A fiberizing installation according to claim 24, wherein the fiberizing installation is an installation for fiberizing mineral wool, rock wool, or glass wool.

27. A fiberizing installation comprising one or more burners, the one or more burners comprising a combustion chamber supplied with fuel and with oxidant, the chamber comprising a casing including a first end which is closed and with an opposite exhaust second end which is open and via which the combustion gases escape, the casing including at least two opposite walls connecting the two ends, and further comprising in the chamber and at the closed first end, at least two combustion devices supplied with oxidant and with fuel, the at least two combustion devices include a first type of combustion device and a second type of combustion device that are configured differently so as respectively to generate two distinct types of flame, and including a system for cooling the two opposite walls by introducing a cooling gas along the two opposite walls, wherein each combustion device includes a body having a first face facing an exterior of the combustion chamber at the first end and a second face opposite to the first face and facing an interior of the combustion chamber, the body including plural oxidant supply ducts and one fuel supply duct passing through a thickness of the body from one face to the other, with an axis of the fuel supply duct being perpendicular to the faces of the body, wherein the first type of combustion device and the second type of combustion device are arranged alternating in a ring on the first face of the body facing the exterior of the combustion chamber, wherein in a case of one of the combustion devices, the oxidant supply ducts are inclined with respect to the axis of the central fuel supply duct and each oxidant supply duct includes an inlet on the first face of the body of the device and an outlet opening onto the surface of the second face of the body of the device, the inlets and the outlets of the ducts being arranged in circles around the central fuel supply duct, wherein in the case of one of the combustion devices, a diameter of the circle of the plural inlets arranged around the central fuel supply duct have a same size as a diameter of the circle of the plural outlets arranged around the central fuel supply duct, and wherein, for each of the plural inlets and outlets, a diameter of the inlet is the same as a diameter of the corresponding outlet.

28. A fiberizing installation according to claim 27, wherein the fiberizing installation is an installation for fiberizing mineral wool, rock wool, or glass wool.

29. A fiberizing installation according to claim 27, wherein the burner is arranged in an enclosed space including an airtight casing that includes at least one pressurized air supply inlet and that further includes passing through it fuel supply pipes connected to the combustion devices.

* * * * *